United States Patent
Prasad et al.

(10) Patent No.: US 10,757,721 B2
(45) Date of Patent: Aug. 25, 2020

(54) DIFFERENTIATED SCHEDULING OF XCAST TRAFFIC

(71) Applicant: NOKIA TECHNOLOGIES OY, Espoo (FI)

(72) Inventors: Athul Prasad, Helsinki (FI); David Navratil, Helsinki (FI); Andreas Maeder, Wuerzburg (DE); Mikko Saily, Laukkoski (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 0 days.

(21) Appl. No.: 16/722,095

(22) Filed: Dec. 20, 2019

(65) Prior Publication Data
US 2020/0205174 A1    Jun. 25, 2020

(30) Foreign Application Priority Data

Dec. 21, 2018  (FI) .................................... 20186126

(51) Int. Cl.
*H04W 72/12*   (2009.01)
*H04W 28/02*   (2009.01)
*H04L 12/18*   (2006.01)

(52) U.S. Cl.
CPC ........ *H04W 72/1242* (2013.01); *H04L 12/189* (2013.01); *H04W 28/0257* (2013.01); *H04W 72/1231* (2013.01)

(58) Field of Classification Search
CPC ............ H04L 12/189; H04W 28/0257; H04W 72/1242; H04W 72/1231
See application file for complete search history.

(56) References Cited

U.S. PATENT DOCUMENTS 10,129,855 B1 *  11/2018  Naim ................. H04W 72/0406
2007/0086361 A1 *  4/2007  Allan ....................... H04L 12/18
                                                                    370/254

(Continued)

FOREIGN PATENT DOCUMENTS

| EP | 2 557 818 A1 | 2/2013 |
| WO | WO 2015/038438 A1 | 3/2015 |
| WO | WO 2018/076280 A1 | 5/2018 |

OTHER PUBLICATIONS

"A Network Layer Seamless Handover Scheme based on Xcast for Wireless LANs"; Li et al.; IEEE Communications Society / WCNC 2005 (Year: 2005).*

(Continued)

*Primary Examiner* — Benjamin H Elliott, IV
(74) *Attorney, Agent, or Firm* — Squire Patton Boggs (US) LLP

(57) ABSTRACT

According to an aspect, there is provided an access node for a radio access network. The access node comprises means for determining, in response to receiving a plurality of data packets associated with one or more radio bearers for scheduling to terminal devices, an over-the-air transmission mode of each radio bearer. The means are further configured to, in response to determining that the one or more radio bearers comprise one or more first explicit multi-unicast, Xcast, radio bearers using multicast and one or more second radio bearers using unicast, schedule the one or more radio bearers according to a first scheduling mechanism. The first scheduling mechanism prioritizes the one or more first Xcast radio bearers to maximize a system throughput.

20 Claims, 8 Drawing Sheets

(56) References Cited

U.S. PATENT DOCUMENTS

| | | | |
|---|---|---|---|
| 2012/0324519 A1* | 12/2012 | Laughlin | H04N 21/2393 725/95 |
| 2017/0374581 A1* | 12/2017 | Dao | H04W 28/06 |
| 2018/0083793 A1* | 3/2018 | Kim | H04L 12/1863 |
| 2018/0092106 A1* | 3/2018 | Rico Alvarino | H04W 72/1205 |
| 2018/0199115 A1 | 7/2018 | Prasad | |

OTHER PUBLICATIONS

"Explicit Multicast over Mobile IP (XMIP)"; Internet Draft; Lee; Jan. 17, 2003 (Year: 2003).*

"Explicit Multicast (Xcast) Basic Specification"; Internet Draft; Feldman et al.; Jun. 2002 (Year: 2002).*

"Limiting the Flooding of Simplified Multicast Forwarding to a Defined Scope"; Hauge et al.; Downloaded on May 13, 2020 at 13:57:57 UTC from IEEE Xplore. (Year: 2018).*

RFC 5058; "Explicit Multicast (Xcast) Concepts and Options"; Boivie et al.; Nov. 2007 (Year: 2007).*

Source Specific Multicast (SSM) Explicit Multicast (Xcast); ETRI, Shin; Jun. 2001 (Year: 2001).*

Communication of Acceptance under section 29a of Patents Decree dated Dec. 18, 2019 corresponding to Finnish Patent Application No. 20186126.

Finnish Search Report dated Jun. 5, 2019 corresponding to Finnish Patent Application No. 20186126.

Office action dated Jun. 5, 2019 corresponding to Finnish Patent Application No. 20186126.

David Gomez-Barquero et al., "Point-to-Multipoint Communication Enablers for the Fifth Generation of Wireless Systems," IEEE Communications Standards Magazine. IEEE, Mar. 2018, vol. 2, No. 1, pp. 53-59.

5G-XCAST, "Broadcast and Multicast Communication Enablers for the Fifth-Generation of Wireless Systems," Deliverable D5.3 Application Layer Intelligence, Version v1.0, Nov. 29, 2018.

Combined Search and Examination Report under Sections 17 and 18(3) dated Apr. 8, 2020 corresponding to Application No. GB1919049.5.

Presenters: "WP3: 5G-Xcast Radio Access Network 5G-Xcast Tutorial Broadcast and Multicast Communication Enablers for 5G," Jun. 5, 2018, pp. 71-80, XP055677319.

* cited by examiner

DIFFERENTIATED SCHEDULING OF XCAST TRAFFIC

TECHNICAL FIELD

Various example embodiments relates to wireless communications.

BACKGROUND

Multicast/broadcast networks have been a key component in Third Generation (3G) and Fourth Generation (4G) LTE-Advanced wireless networks, in enabling resource efficient content distribution. Due to the increase in content quality requirements owing to the introduction of more advanced video and audio codecs and time criticality, the amount of radio resources consumed for delivering the content has been constantly increasing with time. The scarce amount of available spectral resources makes content delivery over-the-air (OTA) increasingly challenging, especially when the media needs to be broadcasted over a wide area. The scheduling of multicast traffic is conventionally done statically based on the synchronized configurations within the radio access network and core network. While such static configurations are sufficient for 4G networks where the main scenario for multicast has been wide-area terrestrial networks with pre-configured transmission areas, a more dynamic solution is required for Fifth Generation (5G) wireless networks. Explicit multi-unicast (Xcast) providing an efficient mix of unicast and multicast has been proposed for use in 5G wireless networks. However, the question remains over how to organize scheduling of Xcast traffic within the 5G radio access network in an efficient and flexible manner so as meet the increasing demands for content quality and time criticality, even in varying system throughput and congestion conditions.

BRIEF DESCRIPTION

According to an aspect, there is provided the subject matter of the independent claims. Embodiments are defined in the dependent claims.

One or more examples of implementations are set forth in more detail in the accompanying drawings and the description below. Other features will be apparent from the description and drawings, and from the claims.

Some embodiments provide an apparatus, a method and a computer readable medium for performing differentiated scheduling.

BRIEF DESCRIPTION OF DRAWINGS

In the following, example embodiments will be described in greater detail with reference to the attached drawings, in which.

DETAILED DESCRIPTION OF SOME EMBODIMENTS

The following embodiments are only presented as examples. Although the specification may refer to "an", "one", or "some" embodiment(s) and/or example(s) in several locations of the text, this does not necessarily mean that each reference is made to the same embodiment(s) or example(s), or that a particular feature only applies to a single embodiment and/or example. Single features of different embodiments and/or examples may also be combined to provide other embodiments and/or examples.

In the following, different exemplifying embodiments will be described using, as an example of an access architecture to which the embodiments may be applied, a radio access architecture based on long term evolution advanced (LTE Advanced, LTE-A) or new radio (NR, 5G), without restricting the embodiments to such an architecture, however. It is obvious for a person skilled in the art that the embodiments may also be applied to other kinds of communications networks having suitable means by adjusting parameters and procedures appropriately. Some examples of other options for suitable systems are the universal mobile telecommunications system (UMTS) radio access network (UTRAN or E-UTRAN), long term evolution (LTE, the same as E-UTRA), wireless local area network (WLAN or WiFi), worldwide interoperability for microwave access (WiMAX), Bluetooth®, personal communications services (PCS), ZigBee®, wideband code division multiple access (WCDMA), systems using ultra-wideband (UWB) technology, sensor networks, mobile ad-hoc networks (MANETs) and Internet Protocol multimedia subsystems (IMS) or any combination thereof.

Figure 1:
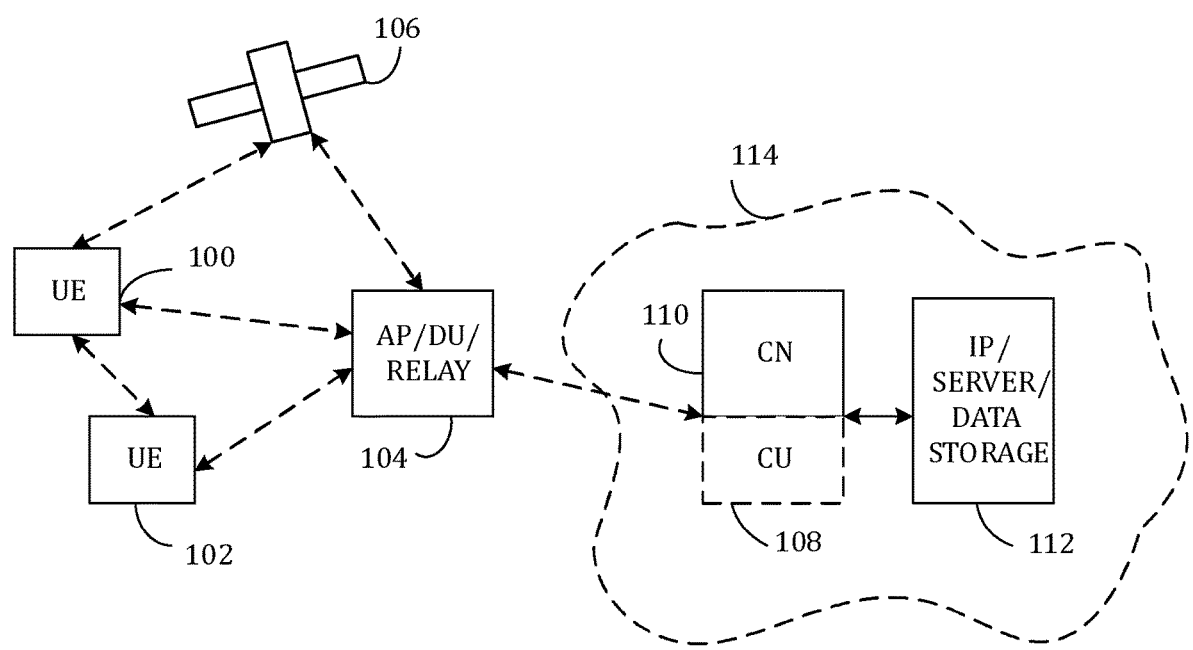
FIGS. 1, 2A, 2B and 2C illustrate exemplary wireless communication systems.

FIG. 1 depicts examples of simplified system architectures only showing some elements and functional entities, all being logical units, whose implementation may differ from what is shown. The connections shown in FIG. 1 are logical connections; the actual physical connections may be different. It is apparent to a person skilled in the art that the system typically comprises also other functions and structures than those shown in FIG. 1.

The embodiments are not, however, restricted to the system given as an example but a person skilled in the art may apply the solution to other communication systems provided with necessary properties.

The example of FIG. 1 shows a part of an exemplifying radio access network.

FIG. 1 shows user devices 100 and 102 configured to be in a wireless connection on one or more communication channels in a cell with an access node (such as (e/g)NodeB) 104 providing the cell (and possibly also one or more other cells). The cells may be equally called sectors, especially when multiple cells are associated with a single access node (e.g., in tri-sector or six-sector deployment). Each cell may define a coverage area or a service area of the access node. Each cell may be, for example, a macro cell or an indoor/outdoor small cell (a micro, femto, or a pico cell). The physical link from a user device to a (e/g)NodeB is called uplink or reverse link and the physical link from the (e/g)NodeB to the user device is called downlink or forward link. It should be appreciated that (e/g)NodeBs or their functionalities may be implemented by using any node, host, server or access point etc. entity suitable for such a usage.

A communications system typically comprises more than one (e/g)NodeB in which case the (e/g)NodeBs may also be configured to communicate with one another over links, wired or wireless, designed for the purpose. These links may be used for signaling purposes. The (e/g)NodeB is a computing device configured to control the radio resources of communication system it is coupled to. The NodeB may also be referred to as a base station, an access point or any other type of interfacing device including a relay station capable of operating in a wireless environment. The (e/g)NodeB includes or is coupled to transceivers. From the transceivers of the (e/g)NodeB, a connection is provided to an antenna unit that establishes bi-directional radio links to user devices. The antenna unit may comprise a plurality of antennas or antenna elements. The (e/g)NodeB is further connected to core network 110 (CN or next generation core NGC). Depending on the system, the counterpart on the CN side can be a serving gateway (S-GW, routing and forwarding user data packets), packet data network gateway (P-GW), for providing connectivity of user devices (UEs) to external packet data networks, or mobile management entity (MME), etc.

The user device (also called UE, user equipment, user terminal, terminal device, etc.) illustrates one type of an apparatus to which resources on the air interface are allocated and assigned, and thus any feature described herein with a user device may be implemented with a corresponding apparatus, such as a relay node. An example of such a relay node is a layer 3 relay (self-backhauling relay) towards the base station.

The user device typically refers to a portable computing device that includes wireless mobile communication devices operating with or without a subscriber identification module (SIM), including, but not limited to, the following types of devices: a mobile station (mobile phone), smartphone, personal digital assistant (PDA), handset, device using a wireless modem (alarm or measurement device, etc.), laptop and/or touch screen computer, tablet, game console, notebook, and multimedia device. It should be appreciated that a user device may also be a nearly exclusive uplink only device, of which an example is a camera or video camera loading images or video clips to a network. A user device may also be a device having capability to operate in Internet of Things (IoT) network which is a scenario in which objects are provided with the ability to transfer data over a network without requiring human-to-human or human-to-computer interaction. The user device (or in some embodiments a layer 3 relay node) is configured to perform one or more of user equipment functionalities. The user device may also be called a subscriber unit, mobile station, remote terminal, access terminal, user terminal or user equipment (UE) just to mention but a few names or apparatuses.

Various techniques described herein may also be applied to a cyber-physical system (CPS) (a system of collaborating computational elements controlling physical entities). CPS may enable the implementation and exploitation of massive amounts of interconnected ICT devices (sensors, actuators, processors microcontrollers, etc.) embedded in physical objects at different locations. Mobile cyber physical systems, in which the physical system in question has inherent mobility, are a subcategory of cyber-physical systems. Examples of mobile physical systems include mobile robotics and electronics transported by humans or animals.

It should be understood that, in FIG. 1, user devices are depicted to include 2 antennas only for the sake of clarity. The number of reception and/or transmission antennas may naturally vary according to a current implementation.

Additionally, although the apparatuses have been depicted as single entities, different units, processors and/or memory units (not all shown in FIG. 1) may be implemented.

5G enables using multiple input-multiple output (MIMO) antennas (each of which may comprise multiple antenna elements), many more base stations or nodes than the LTE (a so-called small cell concept), including macro sites operating in co-operation with smaller stations and employing a variety of radio technologies depending on service needs, use cases and/or spectrum available. 5G mobile communications supports a wide range of use cases and related applications including video streaming, augmented reality, different ways of data sharing and various forms of machine type applications, including vehicular safety, different sensors and real-time control. 5G is expected to have multiple radio interfaces, namely below 6 GHz, cmWave and mmWave, and also being integratable with existing legacy radio access technologies, such as the LTE. Integration with the LTE may be implemented, at least in the early phase, as a system, where macro coverage is provided by the LTE and 5G radio interface access comes from small cells by aggregation to the LTE. In other words, 5G is planned to support both inter-RAT operability (such as LTE-5G) and inter-RI operability (inter-radio interface operability, such as below 6 GHz-cmWave, below 6 GHz-cmWave-mmWave). One of the concepts considered to be used in 5G networks is network slicing in which multiple independent and dedicated virtual sub-networks (network instances) may be created within the same infrastructure to run services that have different requirements on latency, reliability, throughput and mobility.

The current architecture in LTE networks is fully distributed in the radio and fully centralized in the core network. The low latency applications and services in 5G require to bring the content close to the radio which leads to local break out and multi-access edge computing (MEC). 5G enables analytics and knowledge generation to occur at the source of the data. This approach requires leveraging resources that may not be continuously connected to a network such as laptops, smartphones, tablets and sensors. MEC provides a distributed computing environment for application and service hosting. It also has the ability to store and process content in close proximity to cellular subscribers for faster response time. Edge computing covers a wide range of technologies such as wireless sensor networks, mobile data acquisition, mobile signature analysis, cooperative distributed peer-to-peer ad hoc networking and processing also classifiable as local cloud/fog computing and grid/mesh computing, dew computing, mobile edge computing, cloudlet, distributed data storage and retrieval, autonomic self-healing networks, remote cloud services, augmented and virtual reality, data caching, Internet of Things (massive connectivity and/or latency critical), critical communications (autonomous vehicles, traffic safety, real-time analytics, time-critical control, healthcare applications).

The communication system is also able to communicate with other networks, such as a public switched telephone network or the Internet 112, or utilize services provided by them. The communication network may also be able to support the usage of cloud services, for example at least part of core network operations may be carried out as a cloud service (this is depicted in FIG. 1 by "cloud" 114). The communication system may also comprise a central control entity, or a like, providing facilities for networks of different operators to cooperate for example in spectrum sharing.

Edge cloud may be brought into radio access network (RAN) by utilizing network function virtualization (NVF) and software defined networking (SDN). Using edge cloud may mean access node operations to be carried out, at least partly, in a server, host or node operationally coupled to a remote radio head or base station comprising radio parts. It is also possible that node operations will be distributed among a plurality of servers, nodes or hosts. Application of cloudRAN architecture enables RAN real time functions being carried out at the RAN side (in a distributed unit, DU 104) and non-real time functions being carried out in a centralized manner (in a centralized unit, CU 108).

It should also be understood that the distribution of labor between core network operations and base station operations may differ from that of the LTE or even be non-existent. Some other technology advancements probably to be used are Big Data and all-IP, which may change the way networks are being constructed and managed. 5G (or new radio, NR) networks are being designed to support multiple hierarchies, where MEC servers can be placed between the core and the base station or nodeB (gNB). It should be appreciated that MEC can be applied in 4G networks as well.

5G may also utilize satellite communication to enhance or complement the coverage of 5G service, for example by providing backhauling. Possible use cases are providing service continuity for machine-to-machine (M2M) or Internet of Things (IoT) devices or for passengers on board of vehicles, or ensuring service availability for critical communications, and future railway/maritime/aeronautical communications. Satellite communication may utilize geostationary earth orbit (GEO) satellite systems, but also low earth orbit (LEO) satellite systems, in particular mega-constellations (systems in which hundreds of (nano)satellites are deployed). Each satellite 106 in the mega-constellation may cover several satellite-enabled network entities that create on-ground cells. The on-ground cells may be created through an on-ground relay node 104 or by a gNB located on-ground or in a satellite.

It is obvious for a person skilled in the art that the depicted system is only an example of a part of a radio access system and in practice, the system may comprise a plurality of (e/g)NodeBs, the user device may have an access to a plurality of radio cells and the system may comprise also other apparatuses, such as physical layer relay nodes or other network elements, etc. At least one of the (e/g)NodeBs or may be a Home(e/g)nodeB. Additionally, in a geographical area of a radio communication system a plurality of different kinds of radio cells as well as a plurality of radio cells may be provided. Radio cells may be macro cells (or umbrella cells) which are large cells, usually having a diameter of up to tens of kilometers, or smaller cells such as micro-, femto- or picocells. The (e/g)NodeBs of FIG. 1 may provide any kind of these cells. A cellular radio system may be implemented as a multilayer network including several kinds of cells. Typically, in multilayer networks, one access node provides one kind of a cell or cells, and thus a plurality of (e/g)NodeBs are required to provide such a network structure.

For fulfilling the need for improving the deployment and performance of communication systems, the concept of "plug-and-play" (e/g)NodeBs has been introduced. Typically, a network which is able to use "plug-and-play" (e/g)Node Bs, includes, in addition to Home (e/g)NodeBs (H(e/g)nodeBs), a home node B gateway, or HNB-GW (not shown in FIG. 1). A HNB Gateway (HNB-GW), which is typically installed within an operator's network may aggregate traffic from a large number of HNBs back to a core network.

Multicast and Broadcast networks coming under the umbrella of Multimedia Broadcast/Multicast Service (MBMS) have been a key component in Third Generation (3G) and Fourth Generation (4G) LTE-Advanced wireless networks, in enabling resource efficient content distribution. The content has mainly been TV broadcast and public safety (public warning systems and mission critical communication systems) in legacy broadband networks. Due to the improvement in the content quality requirements and time criticality, the amount of radio resources consumed for delivering the content has constantly been increasing with the passage of time. The content quality requirements have been constantly increasing with advanced video and audio codecs enhancing the quality of experience of the end users, and the network operators need to allocate higher amount of radio resources to efficiently and effectively deliver this content to the end user. The scarce amount of available spectral resources makes such content delivery over-the-air (OTA), increasingly challenging, especially when the media is broadcasted over a wide area.

One of the key enhancements for improving spectral efficiency with multicast/broadcast transmissions in LTE is the usage of multicast/broadcast single frequency networks (MBSFN). MBSFN sends synchronized transmissions from multicast base stations—which are time and phase synchronized, with over-the-air (OTA) transmissions of the data packet coordinated using the SYNC protocol. The radio parameters—such as modulation and coding scheme is pre-configured for MBSFN transmissions using the multi-cell coordination entity (MCE). This enables a multitude of base stations within the same MBSFN area to send the exact same data, using the same radio configurations over-the-air, thereby appearing to the UE as a single transmission from a large base station. There are significant spectral efficiency gains, especially for cell-edge users, from using MBSFN as compared to uncoordinated transmissions, due to improved signal strength (i.e. signal to noise ratio) and limiting the interference within the network.

Due to the extensive configuration requirements of MBSFN and the applicability for wide-area broadcast, a simpler single cell-point-to-multipoint (SC-PTM) solution was developed in LTE. SC-PTM has been mainly designed for limited broadcast within a single cell, while taking advantage of the limited pre-configuration requirements and gains from delivering common content using multicast/broadcast, rather than unicast. A key drawback for SC-PTM relative to MBSFN has been the lower spectral efficiency, especially for cell-edge users if the mechanism is employed in a limited number of adjacent cells.

In the 4G LTE evolved Multimedia Broadcast/Multicast Service (eMBMS) systems, the scheduling of multicast/broadcast traffic is done conventionally based on static configuration of guaranteed bit rate (GBR) bearers in the radio access network. The configuration of bit rate in the RAN should correspond to the timing configurations for the SYNC PDUs, done in the BM-SC along with for e.g., the segment size in case DASH encoding is used. Thus, the configurations made on the BM-SC located outside the core network gateway (MBMS-GW) should match the GBR bearer configurations in the RAN, and in case the configurations do not match the packets would be dropped by the RAN thereby causing service interruptions to the end user. The usage of GBR bearers also indicate that in case the segment/SYNC PDU payload size is less than the configured bit rate, significant amount of RAN resources would be underutilized due to the static resource reservation. Here it is also important to note that the radio parameter configurations for the over-the-air transmission (such as modulation and coding scheme) should be pre-configured such that the packet timing indicated in the SYNC PDUs can be enforced within the RAN, which also enables synchronized transmissions between the eNBs within the single frequency network (in the MBSFN scenario). These parameters also ensure that all the devices within the MBSFN area can also receive and successfully decode the received eMBMS transmissions.

In 4G wireless communications networks, the scheduling of multicast/broadcast traffic is done statically based on the synchronized configurations within the radio access network (RAN) and core network. Such static configurations are feasible in 4G where the main scenario for multicast/broadcast has been wide-area terrestrial networks with pre-configured transmission areas—similar to terrestrial broadcast networks. However, 5G wireless network requires a more dynamic solution.

In 5G, especially in the context of Xcast solution (also called mixed-multicast mode), one key design principle is to enable a RAN (i.e., an access node) to decide how to schedule multicast traffic, which could be done locally within a cell or within a configurable area (potentially comprising multiple cells) served by a single gNB. The latter case may correspond, for example, to a centralized deployment, where the gNB comprises a gNB-CU (centralized unit) and multiple DUs (distributed units) connected to said gNB-CU (see FIG. 2B). The over-the-air transmission type (unicast, multicast, broadcast bearers) may be determined dynamically by the access node based on various factors such as user density, distribution and/or radio link conditions. This means that the traditional scheduling configurations for multicast traffic using static radio parameter and timing configurations cannot be efficiently applied in 5G wireless communications networks.

The embodiments to be discussed below overcome and/or alleviate at least some of the problems described above by performing differentiated scheduling of Xcast traffic between sessions (e.g., different video content) depending on a variety of different factors such as the over-the-air transmission mode (unicast, multicast, broadcast), congestion conditions within the (radio) access network, the number of simultaneous Xcast users being served and/or the amount of radio resources consumed for serving the users.

The embodiments to be discussed below may be understood as addressing the congestion in a wireless communications network and/or improving the system throughput (i.e., aggregated throughput). Congestion may be understood as a network condition causing reduced quality of service when a network node or a radio link is carrying more data than it can handle. The embodiments to be discussed below may be understood as improving the system throughput, i.e., the rate of successfully delivered packets over at least one radio link. The system throughput of a first link and at least one second link can be understood as the sum of the data rates that are delivered to all terminals in a wireless communications network.

Figure 2A:
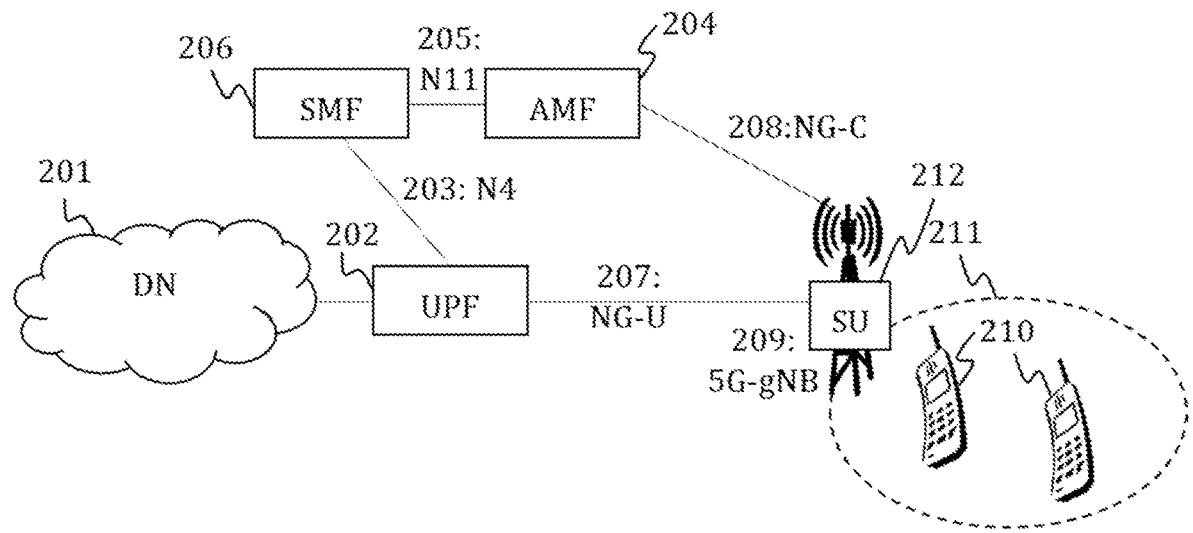
Figure 2B:
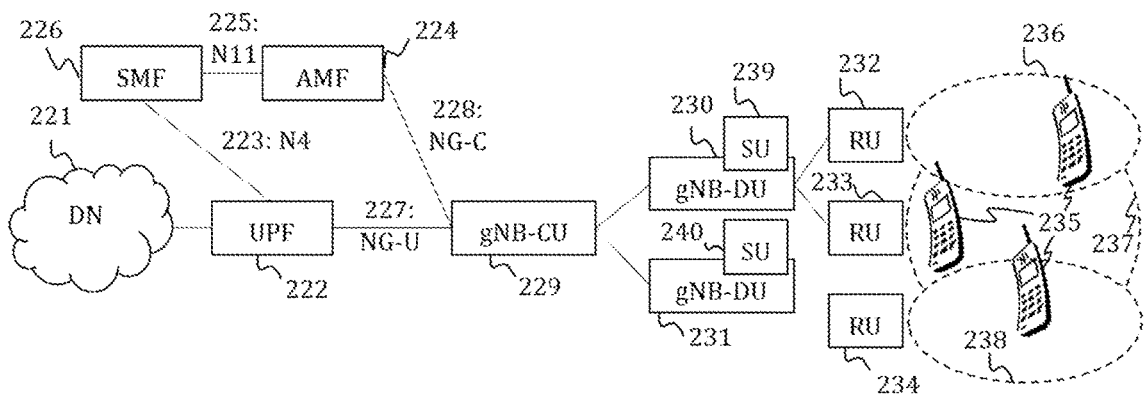
Figure 2C:
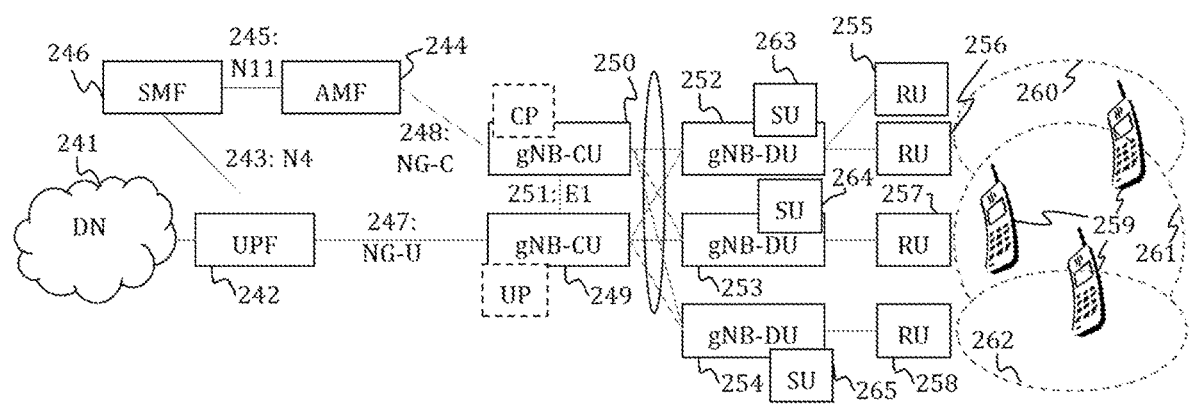

One of the key concepts of the Xcast architecture (equally called mixed-mode architecture) is that the (radio) access network has the flexibility to schedule Xcast traffic, depending on the real-time traffic and (radio) access conditions of the network. Moreover, the architecture is agnostic in terms of the deployment scenarios, that is, in terms of standalone or non-standalone and centralized or decentralized modes of operation of the network. To this end, FIGS. 2A, 2B and 2C illustrate three examples of a simplified system architecture or deployment architectures only showing some elements and functional entities, all being logical units, whose implementation may differ from what is shown. The connections shown in FIGS. 2A, 2B and 2C are logical connections; the actual physical connections may be different. It is apparent to a person skilled in the art that the system typically comprises also other functions and structures than those shown in FIGS. 2A, 2B and 2C. Any of the wireless communications systems 200, 220, 240 of FIGS. 2A, 2B and 2C may be the same communications system as illustrated in FIG. 1. Consequently, one or more of the elements shown in FIG. 1 may be included in the communications system of FIG. 2A, 2B or 2C and vice versa and the discussion in relation to FIG. 1 applies as such also to FIGS. 2A, 2B and 2C. The wireless communication systems illustrated in FIGS. 2A, 2B and 2C may be specifically 5G wireless communications systems.

Specifically, FIGS. 2A, 2B and 2C illustrate, respectively, a fully distributed deployment, a centralized single or multiple DU deployment and a multi-gNB-CU and multi-gNB-DU deployment.

All the illustrated deployments share at least the following elements: a data network (DN) 201, 221, 241, User-Plane Function (UPF) 202, 222, 242, N4 interface 203, 223, 243, Core Access and Mobility Management Function (AMF) 204, 224, 244, N11 interface 205, 225, 245, Session Management Function (SMF) 206, 226, 246, NG-U interface 207, 227, 247 and NG-C interface 208, 228, 248. These elements are discussed jointly for all of FIGS. 2A, 2B and 2C in the following.

The data network 201, 221, 231 corresponds to a network providing operator services, the Internet and/or a network providing 3rd party services. The User-Plane Function (UPF) 202, 222, 242 may provide, for example, one or more of the following functionalities: packet routing & forwarding, packet inspection and QoS handling. The User-Plane Function (UPF) 202, 222, 242 acts as an external PDU session point of interconnect to Data Network (DN) 201, 221, 231 and is an anchor point for intra- & inter-RAT mobility. The N4-interface 203, 223, 243, is an interface between the UPF and the SMF, that is, an interface between the user plane and the control plane. The Core Access and Mobility Management Function (AMF) 204, 224, 244 may provide one or more of the following functionalities: termination of non-access stratum (NAS) signaling, NAS ciphering & integrity protection, registration management, connection management, mobility management, access authentication and authorization and security context management. The Core Access and Mobility Management Function (AMF) 204, 224, 244 is connected via the N11 interface 205, 225, 245 to the Session Management Function (SMF) 206, 226, 246 (e.g., for forwarding messages relating to session management). The Session Management Function (SMF) 206, 226, 246 may provide, for example, one or more functionalities: session management (session establishment, modification and/or release), UE IP address allocation & management, DHCP functions, termination of NAS signaling related to session management, downlink (DL) data notification and traffic steering configuration for the UPF 202, 222, 242 for proper traffic routing. The NG-U interface 207, 227, 247 and the NG-C interface 208, 228, 248 are, respectively, interfaces providing access between the core network and the radio access network(s). Specifically, the NG-U interface 207, 227, 247 is an interface between the UPF 202, 222, 242 and one or more access nodes (i.e., gNBs or units of gNBs) of one or more radio access networks and the NG-C interface 208, 228, 248 is an interface between the AMF 204, 224, 244 and one or more access nodes (i.e., gNBs or units of gNBs) of one or more radio access networks.

In the fully distributed deployment illustrated in FIG. 2A, the UPF 202 and the AMF 204 are connected (via the interfaces 207, 208) to one or more access nodes (i.e., one or more gNBs) 209, each providing and controlling one or more respective cells (or sectors) 211. The one or more cells of radio access network may comprise, for example, one or more of macro cells and small cells such as femtocells, picocells and microcells. The access node (or gNB) 209 may comprise a scheduling unit (equally called a scheduling apparatus or a scheduler) 212 configured to perform the differentiated handling (or scheduling) of Xcast traffic according to embodiments to be discussed below. Each access node 209 may provide one or more terminal devices (user equipment, UEs, or user devices) 210 with wireless access to other networks such as the data network 201. Each cell 211 may comprise one or terminal devices or no terminal devices at any given time. Each terminal device 210 may be defined as described in relation to FIG. 1.

In the centralized single or multiple DU deployment illustrated in FIG. 2B, each gNB is effectively split into two stages, namely into a gNB-CU (centralized unit) and one or more (parallel) gNB-DUs (distributed units). Specifically, the UPF 202 and the AMF 224 are connected (via the interfaces 227, 228) to one or more gNB-CUs 229. The gNB-CU 229 is a logical node configured to perform a subset of gNB functions comprising, for example, transfer of user data, mobility control, radio access network sharing, positioning and/or session management. The gNB-CU 229 may be cloud-based. Each gNB-CU is configured to control one or more gNB-DUs 230, 231 over one or more front-haul interfaces. Each gNB-DU 230, 231 configured to implement another subset of gNB functions comprising, for example, radio scheduling. How the performing of the gNB functions is split between the gNB-CUs and gNB-DUs may be implemented according to one or more different functional split options. The gNB-DU 230, 231 may comprise the scheduling unit 239, 240 configured to perform the differentiated handling of Xcast traffic according to embodiments to be discussed below. Each gNB-DU 230, 231 is connected to one or more RUs (radio units) 232, 233, 234, each providing and controlling one or more respective cells (or sectors) 236, 237, 238. The RUs may also be called remote radio units or remote units. The one or more cells 236 to 238 and the one or more terminal devices 235 in said one or more cells 236 to 238 and their operation may be defined as described for corresponding elements 210, 211 in FIG. 2A.

The multi-gNB-CU and multi-gNB-DU deployment in FIG. 2C is similar to the deployment of FIG. 2B with the difference that the control plane (CP) gNB-CU 250 connected to the AMF 244 is connected via an E1 interface 251 to one or more user plane (UP) gNB-CUs 249 connected to the UPF 242. The CP gNB-CU 250 (or equally gNB-CU-CP) is a logical node hosting the Radio Resource Control (RRC) and the control plane part of a Packet Data Convergence Protocol (PDCP) of the gNB-CU for a gNB (or an en-gNB) while the UP gNB-CU 249 (or equally gNB-CU-UP) is a logical node hosting the user plane part of the PDCP protocol and the Service Data Adaptation Protocol (SDAP) of the gNB-CU for a gNB (or the user plane part of the PDCP protocol of the gNB-CU for an en-gNB). The operation of elements 252 to 262 may be similar as described for corresponding elements in FIGS. 2A and 2B. Also similar to the deployment of FIG. 2B, the gNB-DU 253, 253, 254 may be the entity comprising the scheduling unit 263, 264, 265 performing the differentiated handling of Xcast traffic according to embodiments to be discussed below. An additional constraint regarding the differentiated handling of Xcast traffic in this deployment is that additional information may need to be transferred over the E1 interface 251. This may be necessary, for example, if synchronized transmissions occur over multiple gNB-CUs due to the scheduling of traffic during congestion.

It should be noted that irrespective of the deployment used, the access node, that is, gNB in case of distributed deployments as illustrated in FIG. 2A and gNB-DU in centralized deployments as illustrated in FIGS. 2B and 2C, may decide the over-the-air transmission mode of Xcast traffic. Thus, the same Xcast traffic (i.e., the same Xcast radio bearer or Xcast stream) may be scheduled as unicast for terminal devices receiving the traffic in a first cell while being scheduled as multicast for terminal devices in a second, adjacent cell.

Figure 3:
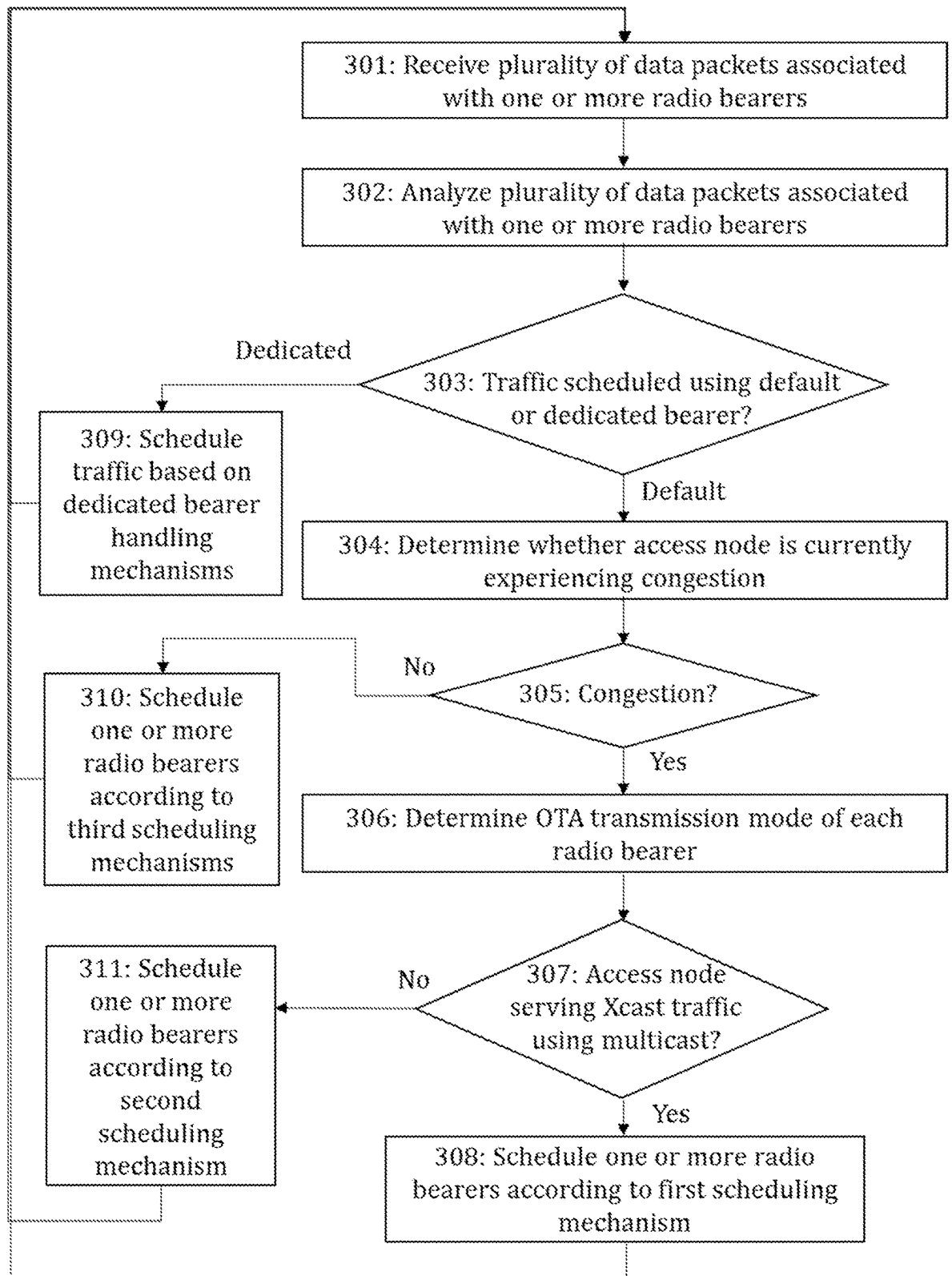
FIGS. 3 to 5 and 7 illustrate exemplary processes according to embodiments.

FIG. 3 illustrates a process according to an embodiment for performing differentiated scheduling of Xcast traffic in a wireless communications network. The illustrated process may be performed by an access node of a radio access network or a scheduling unit comprised therein. Specifically, the illustrated process may be performed by the access node (gNB) 209 or the scheduling unit 212 of FIG. 2A, the gNB-DU 230, 231 or the scheduling unit 239, 240 of FIG. 2B or the gNB-DU 252, 253, 254 or the scheduling unit 263, 264, 265 of FIG. 2C. Here and in the following, the entity performing the process is called simply an access node for brevity.

Referring to FIG. 3, the access node receives, in block 301, a plurality of data packets associated with one or more radio bearers for scheduling to a plurality of terminal devices served by the access node. The one or more radio bearers may comprise one or more radio bearers of one or more of the following types: an Xcast radio bearer using a multicast transmission mode, an Xcast radio bearer using a unicast transmission mode and a unicast radio bearer. The plurality of terminal devices may be located within one or more cells served by the access node.

In response to the receiving in block 301, the access node, first, analyzes, in block 302, the plurality of data packets to determine whether the one or more radio bearers associated with the plurality of data packets correspond to default bearers providing best-effort quality of service (QoS) or to dedicated bearers each of which provides a pre-determined QoS level. The traffic may be over-the-top (OTT) traffic. The over-the-top traffic is traffic relating to over-the-top media services, that is, services for distributing streaming media (e.g., video or audio) as a standalone product directly to users over the Internet, bypassing telecommunications, multichannel television, and broadcast television platforms that traditionally act as a controller or distributor of such content. The embodiments may concern predominantly scheduling OTT traffic. The dedicated bearers may comprise unicast and/or Xcast dedicated bearers while the default bearers may comprise unicast and/or Xcast (best-effort) bearers.

In response to the one or more radio bearers corresponding to one or more dedicated bearers (i.e., the plurality of data packets corresponding to traffic with a pre-determined QoS level) in block 302, the access node may schedule, in block 309, the one or more radio bearers based on one or more dedicated bearer handling mechanisms (that is, one or more scheduling mechanisms specific to a particular dedicated bearer). In some embodiments, actions described in relation to blocks 302, 303, 309 may be omitted.

In response to the one or more radio bearers corresponding to one or more default bearers (i.e., the plurality of data packets associated with the one or more radio bearers corresponding to traffic with best-effort QoS) in block 303, the access node determines, in block 304, whether the access node is currently experiencing congestion based on one or more pre-defined congestion criteria. The one or more pre-defined congestion criteria may, for example, define one or more pre-defined thresholds for one or more metrics indicative of congestion (i.e., one or more congestion metrics). For example, the one or more congestion metrics may comprise the total (downlink) data rate associated with the access node (or a cell served by the access node), the number of terminal devices served by the access node, total resource utilization of the access node, packet loss for data packets transmitted by the access node, transmission delay in the access node and/or total traffic volume of the access node. In other words, the one or more pre-defined congestion criteria comprise at least a first pre-defined threshold for a total data rate of the access node, for the number of terminal devices served by the access node, for the total resource utilization of the access node, for the packet loss for the data packets transmitted by the access node, for the transmission delay in the access node and/or for the total traffic volume of the access node. Thus, the determining whether the access node is currently experiencing congestion based on the one or more pre-defined congestion criteria in block 304 may comprise, for example, comparing a current total data rate associated with the access node to a first pre-defined threshold. The access node is determined, in this case, to experience congestion in response to the total data rate of the access node exceeding the first pre-defined threshold. Obviously, similar comparison may be carried out for other congestion metrics and corresponding pre-defined thresholds in addition or alternative to the total data rate.

In response to the access node failing to experience congestion in block 305, the access node may schedule, in block 310, the one or more radio bearers according to a third scheduling mechanism. The third scheduling mechanism may be, for example, a round-robin scheduling mechanism, a proportional fair scheduling mechanism, a weighted fair queue scheduling mechanism or any other known scheduling mechanism. In some embodiments, actions relating to block 310 may be omitted (i.e., the process may be limited to performing scheduling during congestion).

In response to determining that the access node is experiencing congestion in block 305, the access node further determines, in block 306, at least an over-the-air (OTA) transmission mode of each radio bearer of the one or more radio bearers. The over-the-air (OTA) transmission mode may be unicast, unicast using Xcast and multicast using Xcast. The access node may determine, in block 306, one or more other properties of the one or more radio bearers (e.g., associated traffic volume and/or resource utilization). In the case of multicast, the access node may determine, in block 306, at least the number of terminal devices served by said radio bearer. If the access node is not serving Xcast traffic or if the access node is serving Xcast traffic only using unicast in blocks 307 (i.e., the one or more radio bearers comprise no Xcast radio bearers using a multicast transmission mode), the access node schedules, in block 311, the one or more radio bearers according to a second scheduling mechanism. According to the second scheduling mechanism, the access node may throttle (i.e., limit or regulate the data rate associated with) the one or more radio bearers equally so as to maximize system throughput (thus reducing the congestion). Specifically, the throttling may be applied such that the aforementioned one or more congestion metrics fall below corresponding pre-defined threshold(s) (or specifically to pre-defined levels below the pre-defined threshold). The amount of throttling (that is, the throttling rate) applied to each radio bearer equally may depend at least on the amount of congestion and the number of the plurality of terminal devices served by the access node. As in this case, no multicast streams (i.e., streams provided to multiple terminal devices) are active, the equal throttling provides a fair solution for overcoming the congestion. The throttling rate may be defined as the difference between the data rate before the throttling is applied and the data rate after the throttling has been applied (that is, after the data rate has been limited in order to reduce the congestion and to maximize the system throughput).

In response to the one or more radio bearers comprising one or more first Xcast radio bearers using a multicast transmission mode in block 307, the access node schedules, in block 308, the one or more radio bearers according to a first scheduling mechanism (i.e., a differentiated scheduling mechanism). According to the first scheduling mechanism, the access node prioritizes the one or more first Xcast radio bearers (i.e., multicast radio bearers) to maximize a system throughput associated with the access node (thus also overcoming or at least alleviating the congestion). Specifically, if the one or more radio bearers comprise one or more second radio bearers (i.e., one or more radio bearers using the unicast transmission mode), the one or more first Xcast radio bearers may be prioritized over the one or more second radio bearers (e.g., unicast radio bearers) of the one or more radio bearers, that is, the prioritization may be based at least on the OTA transmission mode. To achieve this, the access node may, for example, throttle the one or more radio bearers (i.e., data rates associated with the one or more radio bearers) at different throttling rates based at least on the OTA transmission mode (to be discussed in more detail in relation to other embodiments). The one or more second radio bearers may comprise one or more radio bearers of the following types: a second Xcast radio bearer using a unicast transmission mode and a unicast radio bearer. The difference between the two types is that while the second Xcast radio bearers may be reconfigured to use a multicast transmission mode (i.e., they may become first Xcast radio bearers as defined above) due to a change in traffic and radio access conditions of the wireless communications network or the same Xcast radio bearer may already be operating using the multicast transmission mode in another cell, the unicast radio bearer may only use the unicast transmission mode. The system throughput associated with the access node to be maximized may be defined as the rate of successfully delivered packets from the access node to the plurality of terminal devices. Specifically, if the access node is a singular entity (as in FIG. 2A), the system throughput may be evaluated from the point of view that singular entity, but if the access node comprises (or is associated with) one or more gNB-CUs and one or more gNB-DUs (as in FIGS. 2B and 2C), the system throughput may be evaluated from the point of view of one of the gNB-CUs in a cooperative manner or from the point of view of the first gNB-DU carrying out the scheduling process.

If the one or more radio bearers comprise no second radio bearers (as defined above), the access node may schedule, in block 308, the one or more first Xcast radio bearers, according to the first scheduling mechanism to maximize the system throughput (with no prioritization based on the used OTA transmission mode enforced). In this case, the prioritization may be based on, for example, the number of terminal devices served by each of the one or more first Xcast radio bearers using the multicast transmission mode (to be discussed below in more detail).

In some embodiments, the scheduling of the one or more radio bearers, in block 308, may be carried out so as to reduce each of one or more congestion metrics of the access node (as listed above) to a respective pre-defined maximum acceptable level smaller or equal to a respective first pre-defined threshold and/or so as to raise the system throughput associated with the access node to a pre-defined minimum acceptable level (that is, minimum acceptable level under congestion). To give a simple example, the access node may perform the scheduling so as to reduce the total data rate of the access node to a pre-defined maximum acceptable level for the total data rate. The pre-defined maximum acceptable level for a congestion metric may be smaller or equal to the first pre-defined threshold for said congestion metric. In the former case, there exists a safety margin between the pre-defined level and the first pre-defined threshold. In some embodiments, the access node may perform the scheduling so as to reduce the values of two or more congestion metrics below two or more respective pre-defined maximum acceptable levels and/or to raise the system throughput to a pre-defined minimum acceptable level. For example, a pre-defined maximum acceptable level may be set for both the total data rate and the number of terminal devices served.

The differentiated scheduling of the Xcast traffic, as discussed in relation to block 308 and to be discussed in relation further embodiments, may be enforced in case of radio resource congestion situation, where due to mobility conditions or traffic variations impacting the shortage of radio resources available for delivering the data. For, e.g., due to mobility the users (i.e., the terminal devices) may move to a worse radio condition requiring higher amount of radio resources for serving the same traffic. In case of congestion, when all the radio resources are utilized in a fully-loaded network, the data rates of the individual users need to be reduced. The throttling of traffic based on traffic type would affect Xcast traffic scheduled using multicast unfairly since the traffic is being delivered to more than one user as compared to unicast traffic.

It may be assumed in this embodiment as well as in relation to further embodiments that the volume of (OTT) multicast traffic may be adapted, e.g. by using Digital Video Broadcasting (DVB) Adaptive media streaming over IP multicast, and thus the throttling of the multicast traffic may be applied. Otherwise, the throttling would result in an unacceptable quality of multicast forcing the terminal devices to switch to unicast.

In some simple embodiments, all of blocks 302 to 305, 309, 310, 311 of FIG. 3 may be omitted. In other words, the access node may perform, upon receiving the plurality of data packets associated with the one or more radio bearers in block 301, directly the determination of the OTA transmission modes of each radio bearer in block 306 and subsequently perform the differentiated scheduling according to the first scheduling mechanism in block 308 if the condition in block 307 is satisfied. In such embodiments, the differentiated scheduling in block 308 may, thus, be carried out irrespective of congestion conditions or type of traffic received as long as the condition in block 307 is satisfied. In some embodiments, the received traffic may be assumed to be using a default bearer (i.e., assumed to use best-effort QoS).

Figure 4:
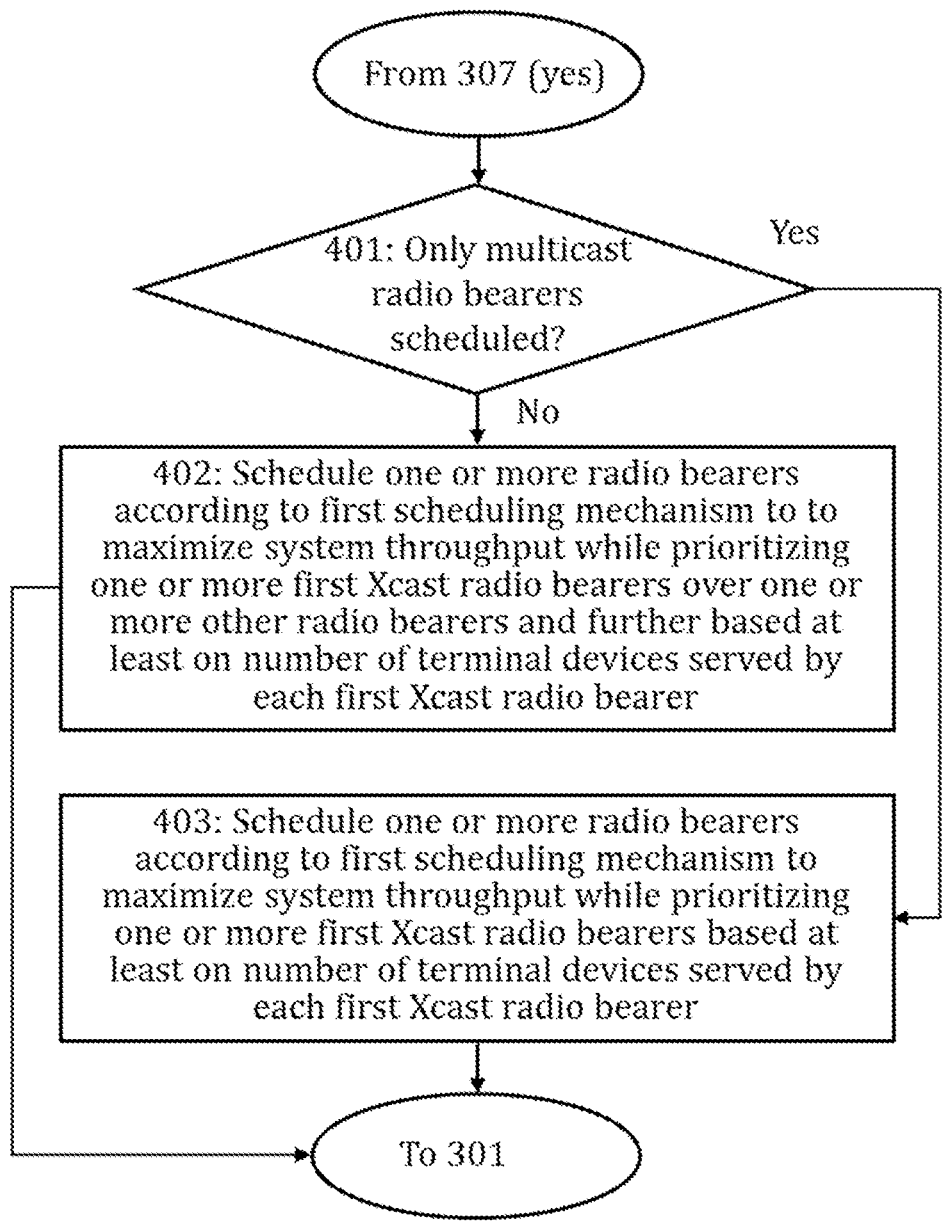

FIG. 4 illustrates a more detailed embodiment for performing the differentiated scheduling under congestion conditions previously discussed in relation to block 308 of FIG. 3. The process illustrated in FIG. 4 may replace block 308 of FIG. 3 in some embodiments.

Referring to FIG. 4, after it has been determined in block 307 of FIG. 3 that the access node is serving Xcast traffic using multicast, it is, first, checked, in block 401, by the access node whether one or more radio bearers other than the one or more first Xcast radio bearers using the multicast transmission mode are to be scheduled. Specifically, it may be checked whether any radio bearers using unicast transmission mode are to be scheduled. If this is the case, the access node schedules, in block 402, the one or more radio bearers according to the first scheduling mechanism. Specifically in this case according to the first scheduling mechanism, the access node performs the scheduling to maximize the system throughput associated with the access node (and thus also to reduce congestion) while prioritizing one or more first Xcast radio bearers over one or more second radio bearers and further based at least on the number of terminal devices served by each first Xcast radio bearer (higher number of terminal devices served corresponding to higher priority).

To achieve such scheduling, the access node may throttle each of the one or more first Xcast radio bearers according to a first throttling rate and each of the one or more second radio bearers according to a second throttling rate. The second throttling rate may be defined to be larger than the first throttling rate (or larger than or equal to the first throttling rate). The first throttling rate may be defined separately for each first Xcast radio bearer based on the number of terminal devices served by said first Xcast radio bearer using the multicast transmission mode. Moreover, the first throttling rate and the second throttling rate may be defined to depend at least on the amount of congestion in the access node. The amount of congestion may be measured using any of the aforementioned congestion metrics, e.g., the total data rate associated with the access node and/or the number of terminal devices served by the access node. Specifically, the amount of congestion may be defined as a current value of the congestion metric or a difference between the current value of the congestion metric and a corresponding first pre-defined threshold. In some embodiments, the first throttling rate may be defined to be inversely proportional to the number of terminal devices served by each first Xcast radio bearer and/or directly proportional to the second throttling rate.

In some embodiments, the first throttling rate for a first Xcast radio bearer may be defined to depend on one or more of the amount of (total) congestion, the number of terminal devices served by the first Xcast radio bearer, radio resource utilization of the first Xcast radio bearer and traffic volume of associated with the first Xcast radio bearer. Further, the second throttling rate may also be defined separately for each second radio bearer of the one or more second radio bearers based on one or more of the amount of (total) congestion, radio resource utilization of the radio bearer and traffic volume associated with the radio bearer.

In some alternative embodiments, the access node may only throttle, in block 402, each of the one or more second radio bearers according to a third throttling rate. In such embodiments, the one or more first Xcast radio bearers may not be throttled at all. The third throttling rate may be defined to depend at least on the amount of congestion though in other embodiments the third throttling rate may depend on one or more of the amount of (total) congestion, radio resource utilization of the radio bearer and traffic volume associated with the radio bearer. In some embodiments, throttling according to this embodiment and the throttling according to any of the previous embodiments may be combined so that the access node selects a throttling scheme of two or more pre-defined throttling schemes based on, for example, the amount of congestion, the number of multicast users served, the number of unicast users served and/or the total data rate. An example of such an embodiment is discussed in detail in relation to FIG. 5.

In some embodiments, any of the first throttling rate, the second throttling rate and the third throttling rate for a radio bearer may be defined to depend not only on the properties of that particular radio bearer (as listed above) but also on the properties of other radio bearers of the same or different type handled by the access node. For example, any of the first, second and third throttling rates may be defined to depend on the number of the one or more second radio bearers served, the number of the terminal devices served by the one or more first Xcast radio bearers and/or the number of the one or more first Xcast radio bearers.

In some embodiments, any of the first throttling rate, the second throttling rate and the third throttling rate for a radio bearer may be defined to be constant.

If it is determined in block 401 that only the one or more first Xcast radio bearers using the multicast transmission mode are to be scheduled, the access node schedules, in block 403, the one or more radio bearers (i.e., the one or more first Xcast radio bearers) according to first scheduling mechanism to maximize the system throughput associated with the access node (and thus also to reduce congestion) while prioritizing the one or more first Xcast radio bearers based at least on number of terminal devices served by each first Xcast radio bearer. In other words, the scheduling of the one or more first Xcast radio bearers may be carried out as discussed above in relation to block 402 with the difference that the one or more first Xcast radio bearers are prioritized over any non-multicast radio bearers (as none exist). As a consequence, the congestion must be overcome in these embodiments by throttling the one or more first Xcast radio bearers which are using the multicast transmission mode, in contrast to the embodiments discussed above where only unicast traffic was throttled.

In some embodiments, the third throttling rate may also be defined separately for each radio bearer of the one or more other second bearers based on one or more of the amount of (total) congestion, radio resource utilization of the radio bearer and traffic volume associated with the radio bearer.

As described above, the differentiated scheduling may also consider the radio resource utilization for Xcast and unicast traffic and base the differentiation in the scheduling on radio resource utilization, as opposed to the number of users served. For example, the access node may apply weighting factors to the data rate of each radio bearer (or stream) based on the radio resource utilization (i.e., defined a throttling rate to depend on the radio resource utilization). This could be valuable, for example, in cases where the Xcast traffic is served using multicast with sub-optimal radio parameter configurations so as to serve also the worst user and/or with limited user feedback.

As also described above, the differentiated scheduling may also consider the traffic volume for Xcast and unicast traffic and base the differentiation in the scheduling on traffic volume, as opposed to the number of users served. For example, additional weighting factors may be provided for traffic volume and applied to each radio bearer (or stream), whereby high-volume Xcast traffic may be penalized at a higher data rate than low-volume traffic in case of congestion.

In some embodiments, the first throttling rate may be limited by the access node during the scheduling of the Xcast (multicast) traffic so as not to exceed a second pre-defined threshold. For example, the access node may estimate a minimum bandwidth required for a certain service and define the second pre-defined threshold based on said minimum bandwidth. Such estimation may be based on information about the content source (e.g., encoding rates of codecs used by service providers may be different even for the same content resolution).

Figure 5:
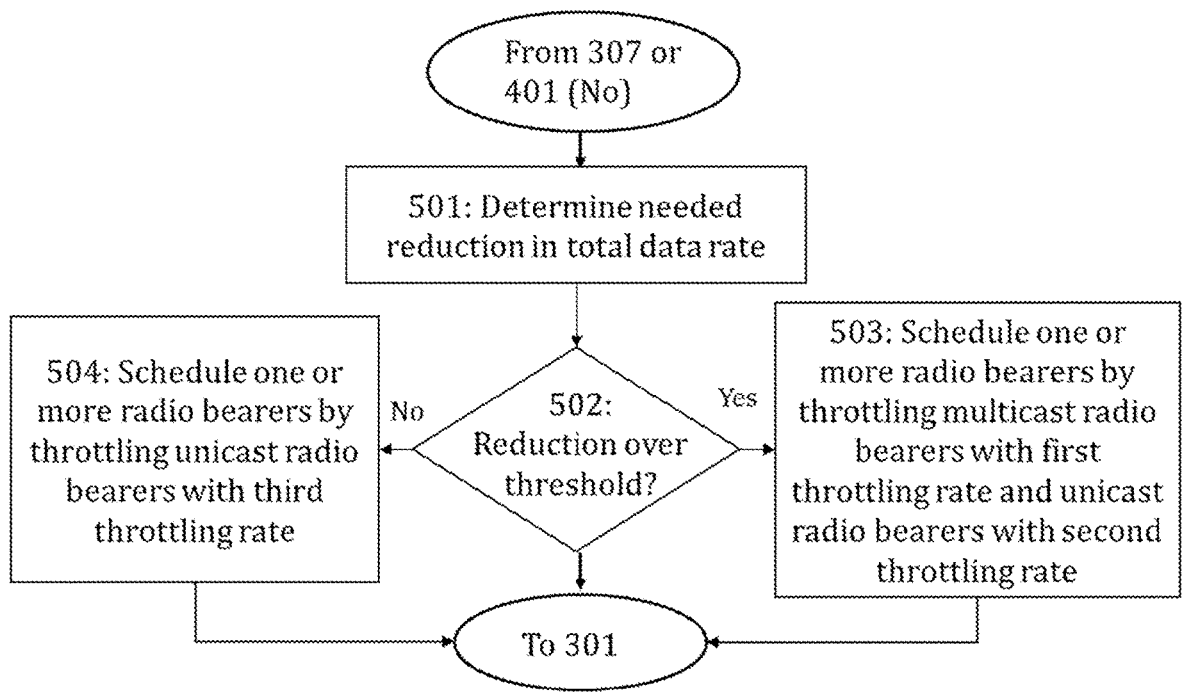

FIG. 5 illustrates another detailed embodiment for performing the differentiated scheduling (possibly under congestion conditions) previously discussed in relation to block 308 of FIG. 3. The process illustrated in FIG. 5 may replace block 308 of FIG. 3 in some embodiments.

Referring to FIG. 5, after it has been determined in block 307 of FIG. 3 that the access node is serving Xcast traffic using multicast and possibly also that the access node is serving both unicast and multicast streams in block 401, it is determined, in block 501, by the access node a reduction c in a total data rate T associated with the access node needed for overcoming the congestion. In other words, the total data rate associated with the access node should be reduced from T Mbps to (T−c) Mbps. Next, the access node evaluates, in block 502, whether the needed reduction in the data rate is above a third pre-defined threshold. The third pre-defined threshold may be a constant or it may depend on one or more parameters such as the number of terminal device operating using a unicast transmission mode, the number of terminal devices operating using the multicast transmission mode used by the one or more first Xcast radio bearer, the number of the one or more first Xcast radio bearers (i.e., number of different multicast streams) and the current total data rate associated with the access node.

In some embodiments, the third pre-defined threshold may correspond to (or depend on) the effective data rate (in Mbps) provided by the access node to the terminal devices receiving a multicast stream. Said effective data rate may be given as $T/[(k+M)N]$, where k is the number of terminal device operating using a unicast transmission mode, N is the number of terminal devices operating using the multicast transmission mode used by the one or more first Xcast radio bearer, M is the number of simultaneous Xcast streams delivered over-the-air using multicast to N devices and T is the current total data rate associated with the access node. Here, round-robin scheduling is assumed in non-congested conditions. In other words, it may be evaluated, in block 502, whether the amount of congestion exceeds the effective data rate of the terminal devices receiving the multicast stream.

In response to the third pre-defined threshold being exceeded in block 502, the access node schedules, in block 503, the one or more radio bearers (e.g., the M first Xcast radio bearers using the multicast transmission mode and the k second radio bearers using the unicast transmission mode), so that a data rate associated with the one or more first Xcast radio bearers are throttled with a first throttling rate and the one or more second radio bearers are throttled with a second throttling rate.

In response to the third pre-defined threshold not being exceeded in block 502, the access node schedules, in block 504, the one or more radio bearers (e.g., the M first Xcast radio bearer using the multicast transmission mode and the k second radio bearers using the unicast transmission mode) so that a data rate associated with the one or more first Xcast radio bearers is not throttled, but the data rate associated with the one or more second radio bearers is throttled with a third throttling rate.

Figure 6:
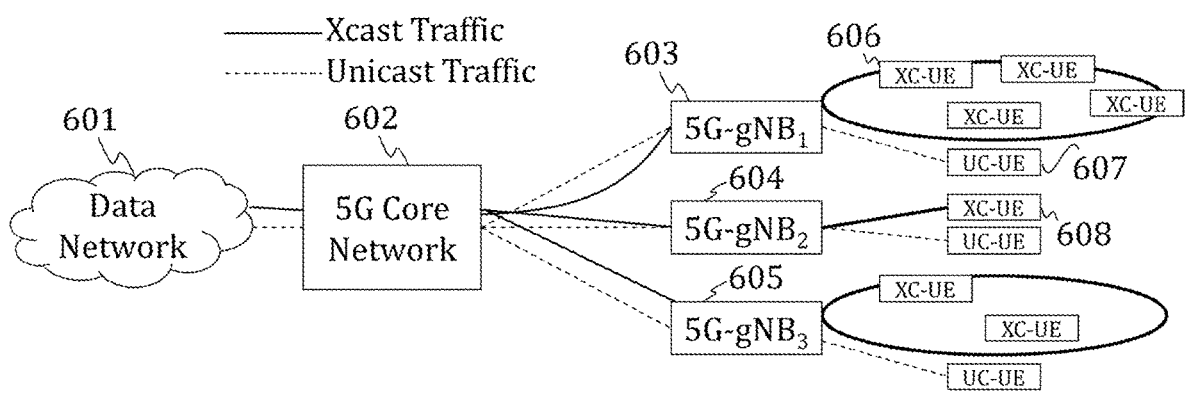
FIG. 6 illustrates three exemplary Xcast traffic scenarios according to embodiments.

FIG. 6 illustrates three exemplary Xcast traffic scenarios to which the embodiment illustrated in FIG. 5 may be applied. In FIG. 6, the Xcast and unicast traffic is simultaneously sent through three different gNBs 603, 604, 605. The Xcast and unicast traffic may represent different application sessions (e.g., consumption of two different live media streams). In the illustrated scenario, Xcast traffic is received by Xcast terminal devices or user equipment (XC-UEs) 606, 608 each of which operates with an OTA transmission mode of unicast 606 or multicast 608 while unicast traffic is received by unicast terminal devices or user equipment (UC-UEs) 607. In the baseline scenario, that is, without any congestion, the radio resources may be scheduled according to the needs of the traffic volume that needs to be served for both the Xcast and unicast traffic. Round-robin scheduling is assumed when there is no congestion. In FIG. 6, Xcast traffic is denoted by a solid line and unicast traffic with a dashed line.

In FIG. 6, it is assumed that the access node is serving total traffic at a total data rate T Mbps using a single Xcast stream transmitted using multicast to N terminal devices and k Xcast streams transmitted using unicast (or other unicast streams) to k terminal devices. It is assumed that the third pre-defined threshold (used in block 502) is defined as T/((k+1)N), where, as defined above, k is the number of terminal device operating using a unicast transmission mode, N is the number of terminal devices operating using the multicast transmission mode used by the one or more first Xcast radio bearer and T is the current total data rate associated with the access node. In the illustrated cases, the first throttling rate may be defined as c/N, the second throttling rate may be defined as c(1−1/N)/k and the third throttling rate may be defined as c, where c is the amount of congestion, that is, specifically a reduction in the total data rate T associated with the access node needed for overcoming the congestion. Using this notation, the data rate for each radio bearer, if there is no congestion and the round-robin scheduling is used, is T/(k+1). Here, N and k are integers with N≥2 and k≥1.

The illustrated generic system comprising a data network 601, a core network 602, the aforementioned three gNBs 603, 604, 605 and terminal devices 606, 607, 608 may correspond to any of the deployment scenarios illustrated in FIGS. 2A, 2B and 2C. To that end, the data network 601 may be the data network 201, 221, 241 of any of FIG. 2A, 2B or 2C, the 5G core network 602 may comprise any of the core network entities 202, 204, 206, 222, 224, 226, 242, 244, 246 illustrated in FIGS. 2A, 2B and 2C and the 5G-gNBs 603, 604, 605 may correspond to gNB 209 of FIG. 2A or comprise one or more gNB-CUs 229, 249, 250, one or more gNB-DUs 230, 231, 252, 253, 254, and one or more RUs 232, 233, 234, 255, 256, 257, 258 as illustrated in FIGS. 2B and 2C.

The first gNB 603 of FIG. 6 provides four XC-UEs 606 with the same Xcast (multicast) stream and a single UC-UE 607 with a unicast stream. Specifically, there are four XC-UEs receiving a single multicast stream at a rate of T/2 Mbps before congestion and one UC-UE receiving unicast data with a rate of T/2 Mbps before congestion. The differentiated 5G scheduler considers the effective data rate of XC-UEs to be (T/2)/4=T/8 during congestion for reducing the data rates of the scheduled traffic. Thus, in this scenario if c<T/8 in block 502 of FIG. 5, the Xcast stream delivered to the XC-UEs is left unthrottled, while the data rate of the UC-UE 607 is reduced to (T/2)−c, according to block 504 of FIG. 5. This enables the first gNB 603 to serve the users at a reduced rate while not impacting the Xcast stream. If c>T/8 block 502 of FIG. 5, then the access node reduces the data rate of the Xcast stream by c/4 and the data rate of the unicast stream by 3c/4, according to block 503 of FIG. 5.

The second gNB 604 of FIG. 6 provides a single XC-UE 608 with an Xcast (unicast) stream and a single UC-UE with a unicast stream. Since there is only a single XC-UE 608, the Xcast traffic is scheduled using unicast and thus no differentiated handling is required (according to block 307 of FIG. 3). Instead, the access node schedules the Xcast and unicast streams (or equally the Xcast radio bearer and the unicast radio bearer) according to the second scheduling mechanism, as discussed in relation block 311 of FIG. 3.

The third gNB 605 of FIG. 6 provides two XC-UEs with the same Xcast (multicast) stream and a single UC-UE with a unicast stream. Specifically, there are two XC-UEs receiving a single multicast stream at a rate of T/2 Mbps before congestion and one UC-UE receiving unicast data with a rate of T/2 Mbps before congestion. The differentiated 5G scheduler considers the effective data rate of XC-UEs to be (T/2)/2=T/4 during congestion for reducing the data rates of the scheduled traffic. Thus, in this scenario if c<T/4 in block 502 of FIG. 5, the Xcast stream delivered to the XC-UEs is left unthrottled, while the data rate of the UC-UE is reduced to T/2-c, according to block 504 of FIG. 5. Notably, this condition is more easily triggered (i.e., the threshold in block 502 is higher) compared to the first gNB 603. If c>T/4 block 502 of FIG. 5, then the access node reduces the data rate of the Xcast stream by c/2 and the unicast stream by c/2, according to block 503 of FIG. 5. Therefore, in this scenario the Xcast (multicast) stream may be prioritized over the unicast stream if the congestion is relatively minor, but once the congestion reaches a certain level, the Xcast and unicast streams are treated equally in order to overcome the higher congestion. It should be noted that such operation according to the embodiment of FIG. 5 can only occur when N=2.

As described above, any of the aforementioned processes may be applied in any of the deployment scenarios illustrated in FIGS. 2A, 2B and 2C with the access node carrying out the process corresponding to a gNB (FIG. 2A) or a gNB-DU (FIGS. 2B and 2C). However, the process of FIG. 3 may be modified slightly in the latter case in order to take full advantage of the centralized architecture of FIGS. 2B and 2C. The modified process is illustrated in FIG. 7.

In this embodiment if applied for the deployment scenario of FIG. 2B, it is assumed that the access node (as used in relation to previous embodiments) is a first gNB-DU (e.g., the gNB-DU 230 of FIG. 2B) in a centralized deployment scenario of a 5G wireless communications network. Further, the first gNB-DU is a part of a gNB further comprising one or more second gNB-DUs (e.g., the gNB-DU 231 of FIG. 2B) and a first gNB-CU (e.g., the gNB-CU 229 of FIG. 2B). The first gNB-CU is connected via an F1 interface to each gNB-DU.

Figure 7:
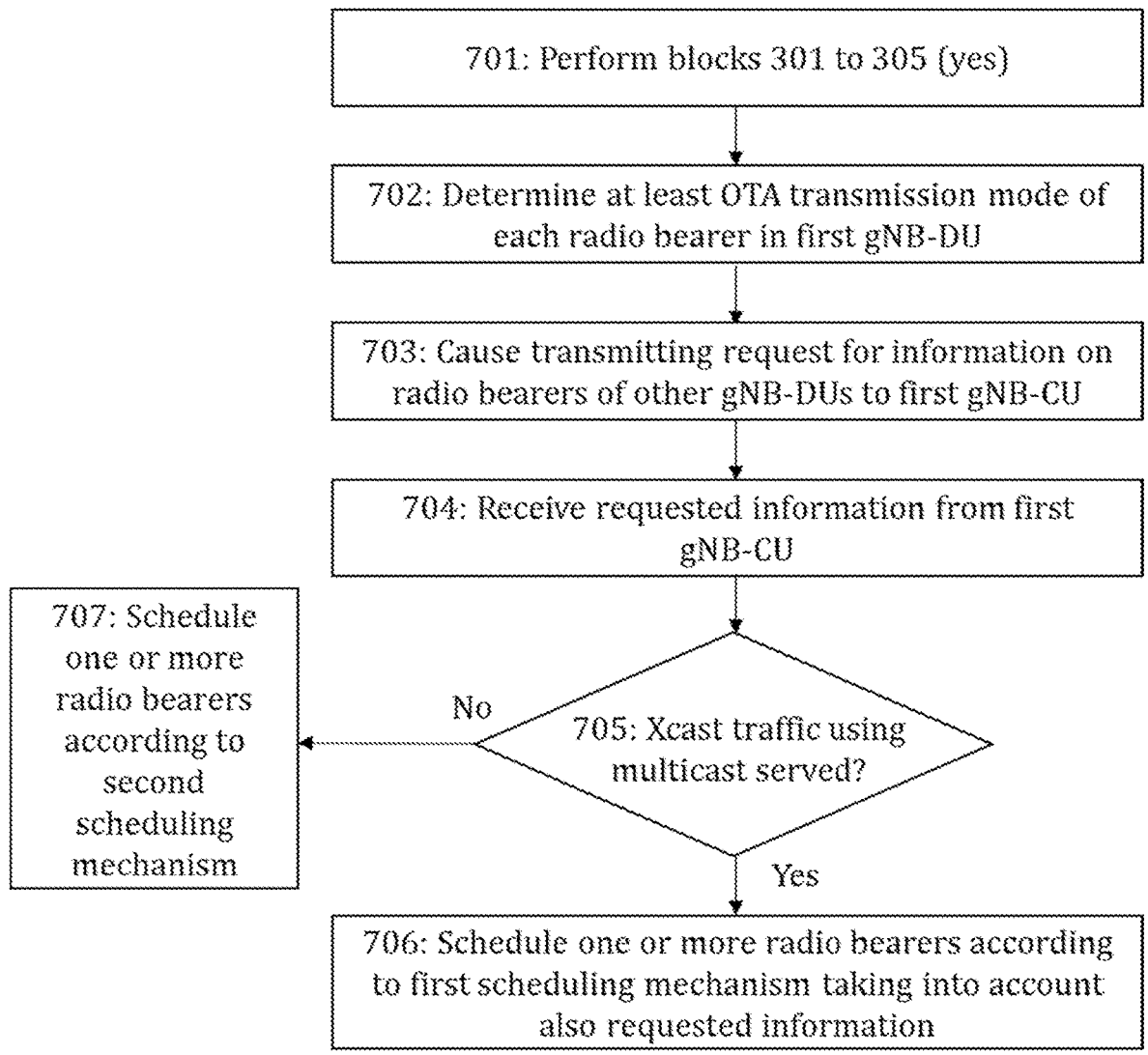

Referring to FIG. 7, the first gNB-DU (i.e., the access node as used in relation to FIG. 3) may carry out, in block 701, blocks 301 to 305 (yes) of FIG. 3. In response to determining that the first gNB-DU is experiencing congestion (according to block 305 of FIG. 3), the first gNB-DU determines, in block 702, the over-the-air transmission mode of each radio bearer in the first gNB-DU. Further, the first gNB causes transmitting, in block 703, a request for information on the one or more second gNB-DUs to the first gNB-CU. Specifically, the information on the one or more second gNB-DUs which is requested may comprise at least radio bearer information on each radio bearer used by each of the one or more second gNB-DUs (or at least each radio bearer shared by the first gNB-DU and at least one second gNB-DU). For example, the radio bearer information for a radio bearer may comprise information on the OTA transmission mode of the radio bearer and/or the number of terminal devices served by the radio bearer. Additionally or alternatively, the radio bearer information for the radio bearer may comprise information on the radio resource utilization of the radio bearer and/or traffic volume associated with the radio bearer.

Upon receiving the request, the first gNB-CU may communicate with the one or more second gNB-DUs in order to attain the requested information and/or said information may be maintained in a database of the first gNB-CU. Subsequently, the first gNB-CU causes transmitting the requested information to the first gNB-DU. The first gNB-DU receives, in block 704, the requested information from the first gNB-CU. The request and the requested information may be transmitted and the communication between the first gNB-CU and the one or more second gNB-DU carried out via F1 interfaces.

It is determined, in block 705, whether the radio bearers used in any of the first gNB-DU and the one or more second gNB-DUs comprise at least one first Xcast radio bearer using the multicast transmission mode (that is, using the multicast transmission mode in that particular gNB-DUs). In some alternative embodiments, only some (or even none) of the one or more second gNB-DUs may be taken into account in block 705. If the multicast mode is used in any of the first gNB-DU and the one or more second gNB-DUs (or a specific subset thereof), the first gNB-DU may perform, in block 706, the scheduling of the one or more radio bearers according to the first scheduling mechanism, similar to as described in relation to any of blocks 308, 402, 403. In other words, the requested information may be used in block 705 so that the differentiated scheduling using the first scheduling mechanism may be triggered even if no Xcast streams using multicast are provided by the first gNB-DU if one or more Xcast streams using unicast in the first gNB-DU use multicast in any of the one or more second gNB-DUs.

Furthermore, in this embodiment the first gNB-DU may take into account in the scheduling of the one or more radio bearers in the first gNB-DU, in addition to the OTA transmission modes of the one or more radio bearers in the first gNB-DU, also transmission modes of the same one or more radio bearers in the one or more second gNB-DUs. Specifically, the use of any of said one or more radio bearers in the one or more second gNB-DUs may affect the scheduling so that a use of the multicast transmission mode for a radio bearer of the one or more radio bearers in at least one of the one or more second gNB-DUs causes an increase in priority (e.g., decrease in throttling rate) for said radio bearer in the first gNB-DU. Similar to as described for previous embodiments, the throttling rate (e.g., the first, second and/or third throttling rate as defined above) for a radio bearer may be defined to depend on one or more of the amount of (total) congestion in the first gNB-DU, the number of terminal devices served by the radio bearer in the first gNB-DU and one or more second gNB-DUs, radio resource utilization of the radio bearer in the first gNB-DU and one or more second gNB-DUs and traffic volume of associated with the radio bearer in the first gNB-DU and one or more second gNB-DUs.

In other words, the various parameters discussed above in relation scheduling under congestion conditions (e.g., the number of terminal devices served using unicast/multicast per gNB-DU, the number of multicast streams per gNB-DU, resource utilization per gNB-DU and traffic volume per gNB-DU) may be considered from the gNB-CU perspective, where even if Xcast traffic is served using unicast in a few DUs while multicast is used in other DUs, the Xcast unicast transmission mode could be prioritized using lower weighting factors (e.g., lower throttling rate), as compared to (pure) unicast. The idea here is that the Xcast traffic on average may still provide significant radio resource utilization efficiency as compared unicast traffic, even though the gains are distributed over different DUs. The scheduling in blocks 309, 310, 311 may be carried out in this case similar to as described in relation to above embodiments.

The functionalities described above for the deployment scenario of FIG. 2B may also be employed in relation to the deployment scenario of FIG. 2C.

In some alternative embodiments, the requesting and receiving information from the first gNB-DU (i.e., blocks 704, 705) may be carried out already before block 702. In such embodiments, the requested information may be utilized also in the scheduling according to the second scheduling mechanism in block 707, in a similar manner as described for block 706. Alternatively, the requesting and receiving information from the first gNB-DU (i.e., blocks 703, 704) may be carried out already only after block 705 so that the decision in block 705 is based only on the use of multicast transmission mode in the first gNB-DU.

The blocks, related functions, and information exchanges described above by means of FIGS. 2 to 7 in no absolute chronological order, and some of them may be performed simultaneously or in an order differing from the given one. Other functions can also be executed between them or within them, and other information may be sent, and/or other rules applied. Some of the blocks or part of the blocks or one or more pieces of information can also be left out or replaced by a corresponding block or part of the block or one or more pieces of information.

Figure 8:
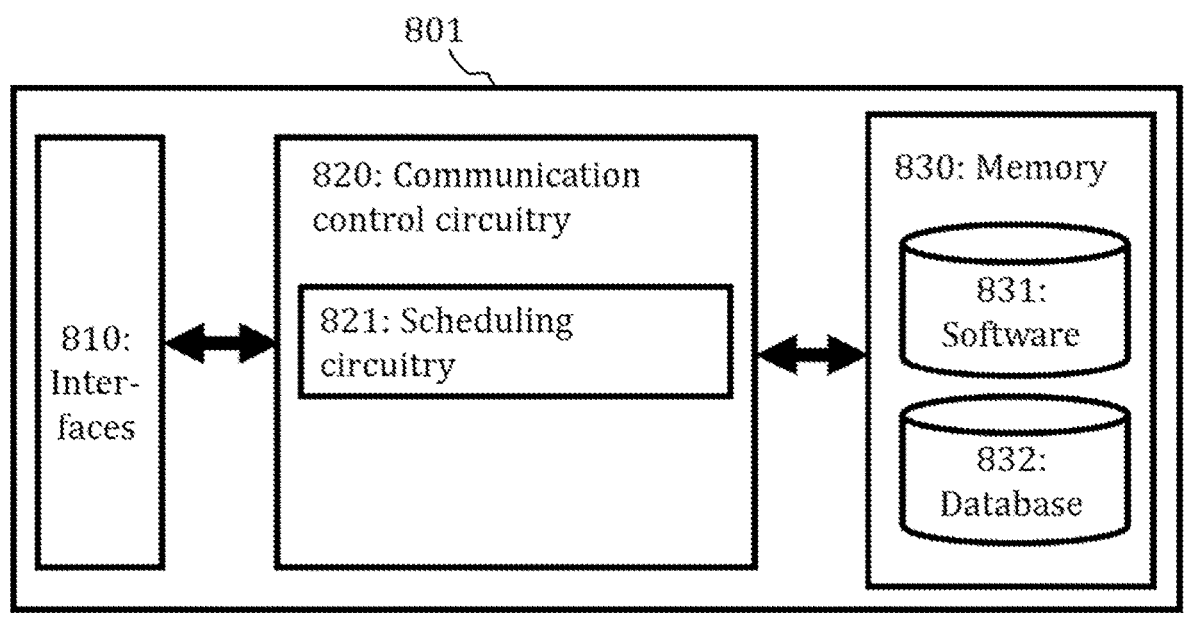
FIG. 8 illustrates an apparatus according to embodiments.

FIG. 8 provides an access node (e.g., a gNB or a gNB-DU) or a scheduling unit for an access node 801 according to some embodiments. Specifically, FIG. 8 may illustrate an access node configured to carry out at least the functions described above in connection with scheduling of traffic, especially differentiated scheduling during congestion. The access node 801 may be the access node 209 of FIG. 2A, one of the gNB-DUs 230, 231 of FIG. 2B or one of the gNB-DUs 252, 253, 254 of FIG. 2C. Alternatively, FIG. 8 may depict any scheduling unit 212, 239, 240, 263, 264, 265 of FIGS. 2A, 2B and 2C (later just "the access node" is used for referring to element 801 for brevity). The access node 801 may comprise one or more control circuitry 820, such as at least one processor, and at least one memory 830, including one or more algorithms 831, such as a computer program code (software) wherein the at least one memory and the computer program code (software) are configured, with the at least one processor, to cause the access node to carry out any one of the exemplified functionalities of the access node described above, respectively. Said at least one memory 830 may also comprise at least one database 832.

Referring to FIG. 8, the one or more communication control circuitry 820 of the access node 801 comprise at least scheduling circuitry 821 which is configured to perform the scheduling of traffic associated with one or more radio bearers to a plurality of terminal devices. To this end, the scheduling circuitry 821 of the access node 801 is configured to carry out at least some of the functionalities described above by means of any of FIGS. 3 to 7 using one or more individual circuitries.

Referring to FIG. 8, the memory 830 may be implemented using any suitable data storage technology, such as semiconductor based memory devices, flash memory, magnetic memory devices and systems, optical memory devices and systems, fixed memory and removable memory.

Referring to FIG. 8, the access node 801 may further comprise different interfaces 810 such as one or more communication interfaces (TX/RX) comprising hardware and/or software for realizing communication connectivity according to one or more communication protocols. Specifically, the one or more communication interfaces 810 may comprise, for example, interfaces providing a connection to the Internet and a core network of a wireless communications network. The one or more communication interface 810 may provide the access node with communication capabilities to communicate in a cellular communication system and enable communication between user devices (terminal devices) and different network nodes or elements and/or a communication interface to enable communication between different network nodes or elements, for example. The one or more communication interfaces 810 may comprise standard well-known components such as an amplifier, filter, frequency-converter, (de)modulator, and encoder/decoder circuitries, controlled by the corresponding controlling units, and one or more antennas.

As used in this application, the term 'circuitry' may refer to one or more or all of the following: (a) hardware-only circuit implementations, such as implementations in only analog and/or digital circuitry, and (b) combinations of hardware circuits and software (and/or firmware), such as (as applicable): (i) a combination of analog and/or digital hardware circuit(s) with software/firmware and (ii) any portions of hardware processor(s) with software, including digital signal processor(s), software, and memory(ies) that work together to cause an apparatus, such as a terminal device or an access node, to perform various functions, and (c) hardware circuit(s) and processor(s), such as a microprocessor(s) or a portion of a microprocessor(s), that requires software (e.g. firmware) for operation, but the software may not be present when it is not needed for operation. This definition of 'circuitry' applies to all uses of this term in this application, including any claims. As a further example, as used in this application, the term 'circuitry' also covers an implementation of merely a hardware circuit or processor (or multiple processors) or a portion of a hardware circuit or processor and its (or their) accompanying software and/or firmware. The term 'circuitry' also covers, for example and if applicable to the particular claim element, a baseband integrated circuit for an access node or a terminal device or other computing or network device.

In an embodiment, at least some of the processes described in connection with FIGS. 2 to 7 may be carried out by an apparatus comprising corresponding means for carrying out at least some of the described processes. Some example means for carrying out the processes may include at least one of the following: detector, processor (including dual-core and multiple-core processors), digital signal processor, controller, receiver, transmitter, encoder, decoder, memory, RAM, ROM, software, firmware, display, user interface, display circuitry, user interface circuitry, user interface software, display software, circuit, antenna, antenna circuitry, and circuitry. In an embodiment, the at least one processor, the memory, and the computer program code form processing means or comprises one or more computer program code portions for carrying out one or more operations according to any one of the embodiments of FIGS. 2 to 7 or operations thereof.

Embodiments as described may also be carried out in the form of a computer process defined by a computer program or portions thereof. Embodiments of the methods described in connection with FIGS. 3 to 5 and 7 may be carried out by executing at least one portion of a computer program comprising corresponding instructions. The computer program may be provided as a computer readable medium comprising program instructions stored thereon or as a non-transitory computer readable medium comprising program instructions stored thereon. The computer program may be in source code form, object code form, or in some intermediate form, and it may be stored in some sort of carrier, which may be any entity or device capable of carrying the program. For example, the computer program may be stored on a computer program distribution medium readable by a computer or a processor. The computer program medium may be, for example but not limited to, a record medium, computer memory, read-only memory, electrical carrier signal, telecommunications signal, and software distribution package, for example. The computer program medium may be a non-transitory medium. Coding of software for carrying out the embodiments as shown and described is well within the scope of a person of ordinary skill in the art.

Even though the embodiments have been described above with reference to examples according to the accompanying drawings, it is clear that the embodiments are not restricted thereto but can be modified in several ways within the scope of the appended claims. Therefore, all words and expressions should be interpreted broadly and they are intended to illustrate, not to restrict, the embodiment. It will be obvious to a person skilled in the art that, as technology advances, the inventive concept can be implemented in various ways. Further, it is clear to a person skilled in the art that the described embodiments may, but are not required to, be combined with other embodiments in various ways.

The invention claimed is:

1. An access node for a radio access network, the access node comprising:
   at least one processor; and
   at least one memory including computer program code, the at least one memory and computer program code being configured, with the at least one processor, to cause the access node to perform:
   receiving a plurality of data packets associated with one or more radio bearers for scheduling to a plurality of terminal devices served by the access node; and
   determining an over-the-air transmission mode of each radio bearer of the one or more radio bearers;
   wherein the access node is further configured to perform:
   in response to determining that the one or more radio bearers comprise one or more first explicit multi-unicast, Xcast, radio bearers using a multicast transmission mode and one or more second radio bearers using a unicast transmission mode, scheduling the one or more radio bearers according to a first scheduling mechanism, wherein the first scheduling mechanism prioritizes the one or more first Xcast radio bearers over the one or more second radio bearers to maximize a system throughput associated with the access node by
   throttling each of the one or more first Xcast radio bearers according to a first throttling rate and each of the one or more second radio bearers according to a second throttling rate larger than the first throttling rate, wherein the first throttling rate is defined separately for each first Xcast radio bearer based on the number of terminal devices served by said first Xcast radio bearer and the first throttling rate and the second throttling rate are defined to depend at least on the amount of congestion in the access node; or
   throttling each of the one or more second radio bearers according to a third throttling rate, wherein the third throttling rate is defined to depend at least on the amount of congestion in the access node.

2. The access node of claim 1, wherein the first throttling rate is defined separately for each first Xcast radio bearer further based on one or more of the amount of congestion, radio resource utilization of the first Xcast radio bearer and traffic volume of associated with the first Xcast radio bearer and the second throttling rate is defined separately for each radio bearer of the one or more second radio bearers based on one or more of the amount of congestion, radio resource utilization of the radio bearer and traffic volume associated with the radio bearer.

3. The access node of claim 1, wherein the first throttling rate is defined to be inversely proportional to the number of terminal devices served by each first Xcast radio bearer or directly proportional to the second throttling rate.

4. The access node according to claim 1, wherein the access node is configured to perform the scheduling according to the first scheduling mechanism by throttling each of the one or more first Xcast radio bearers according to the first throttling rate and each of the one or more second radio bearers according to the second throttling rate while limiting the first throttling rate so as not to exceed a second pre-defined threshold.

5. The access node according to claim 1, wherein the access node is further configured to perform the scheduling according to the first scheduling mechanism by:
  determining a reduction in a total data rate associated with the access node needed for overcoming congestion;
  determining whether the needed reduction in the total data rate exceeds a third pre-defined threshold;
    performing said throttling of each of the one or more first Xcast radio bearers according to the first throttling rate and each of the one or more second radio bearers according to the second throttling rate only in response to the needed reduction in the total data rate exceeding the third pre-defined threshold; and
    in response to the needed reduction in the total data rate failing to exceed the third pre-defined threshold, throttling each of the one or more second radio bearers according to a third throttling rate.

6. An access node for a radio access network, the access node comprising:
  at least one processor; and
  at least one memory including computer program code, the at least one memory and computer program code being configured, with the at least one processor, to cause the access node to perform:
  receiving a plurality of data packets associated with one or more radio bearers for scheduling to a plurality of terminal devices served by the access node;
  determining an over-the-air transmission mode of each radio bearer of the one or more radio bearers; and
  in response to determining that the one or more radio bearers comprise one or more first explicit multi-unicast, Xcast, radio bearers using a multicast transmission mode and one or more second radio bearers using a unicast transmission mode, scheduling the one or more radio bearers according to a first scheduling mechanism, wherein the first scheduling mechanism prioritizes the one or more first Xcast radio bearers over the one or more second radio bearers to maximize a system throughput associated with the access node by throttling each of the one or more second radio bearers according to a third throttling rate.

7. The access node of claim 5, wherein the third throttling rate is defined separately for each radio bearer of the one or more second radio bearers based on one or more of the amount of congestion in the access node, radio resource utilization of the radio bearer and traffic volume associated with the radio bearer.

8. The access node according to claim 1, wherein the access node is further configured to perform:
  in response to the determining that the one or more radio bearers comprise the one or more first Xcast radio bearers using the multicast transmission mode and the one or more second radio bearers using the unicast transmission mode, performing the scheduling of the one or more radio bearers according to the first scheduling mechanism so as to further prioritize the one or more first Xcast radio bearers individually based on the number of terminal devices served by each first Xcast radio bearer, a higher number of terminal devices served by a first Xcast radio bearer corresponding to higher priority.

9. The access node according to claim 1, wherein the access node is further configured to perform:
  in response to the determining that the one or more radio bearers comprise the one or more first Xcast radio bearers using the multicast transmission mode but no second radio bearers using the unicast transmission mode, scheduling the one or more radio bearers according to the first scheduling mechanism by prioritizing the one or more first Xcast radio bearers individually based on the number of terminal devices served by each first Xcast radio bearer, a higher number of terminal devices served by a first Xcast radio bearer corresponding to higher priority.

10. The access node according to claim 1, wherein the access node is further configured to perform:
  in response to determining that the one or more radio bearers comprise no first Xcast radio bearers using the multicast transmission mode, scheduling the one or more radio bearers according to a second scheduling mechanism to maximize the system throughput associated with the access node by throttling the one or more radio bearers equally.

11. The access node according to claim 1, wherein the access node is further configured to perform:
  determining, in response to the receiving, whether the access node is currently experiencing congestion based on one or more pre-defined congestion criteria; and
  performing the determining of the over-the-air transmission mode of each radio bearer of the one or more radio bearers only in response to determining that the access node is experiencing congestion.

12. The access node of claim 11, wherein the one or more pre-defined congestion criteria comprise at least one or more first pre-defined thresholds for one or more congestion metrics associated with the access node and the determining whether the access node is currently experiencing congestion based on the one or more pre-defined congestion criteria comprises comparing one or more current values of one or more congestion metrics of the access node to the one or more first pre-defined thresholds, the access node being determined to experience congestion in response to the one or more current values exceeding the one or more first pre-defined thresholds.

13. The access node according to claim 12, wherein the one or more congestion metrics comprise one or more of a total data rate associated with the access node or a cell served by the access node, the number of terminal devices served by the access node, total resource utilization of the access node, packet loss for data packets transmitted by the access node, transmission delay in the access node and total traffic volume of the access node.

14. The access node according to claim 12, wherein the access node is further configured to perform, in response to determining that the access node is experiencing congestion and that the one or more radio bearers comprise at least the one or more first explicit multi-unicast, Xcast, radio bearers using the multicast transmission mode, the scheduling of the one or more radio bearers according to the first scheduling mechanism so as to reduce each of the one or more congestion metrics of the access node to a respective pre-defined maximum acceptable level smaller or equal to a respective first pre-defined threshold or so as to raise the system throughput associated with the access node to a pre-defined minimum acceptable level.

15. The access node according to claim 12, wherein the access node is further configured to perform:
    in response to determining that the radio access network is not experiencing congestion, scheduling the one or more radio bearers according to a third scheduling mechanism being one of a round-robin scheduling mechanism, a weighted fair queue scheduling mechanism and a proportional fair scheduling mechanism.

16. The access node according to claim 12, wherein the access node is further configured to perform:
    determining, in response to the receiving, whether the one or more radio bearers associated with the plurality of data packets are default bearers providing best-effort quality of service or dedicated bearers each of which provides a pre-determined quality of service level;
    in response to the one or more radio bearers being dedicated bearers, scheduling the one or more radio bearers based on one or more dedicated bearer handling mechanisms; and
    performing the determining whether the radio access network is currently experiencing the congestion only in response to the one or more radio bearers being standard bearers providing best-effort quality of service.

17. The access node according to claim 1, wherein the access node comprises a gNodeB, gNB, for a fully distributed deployment scenario of a 5G wireless communications network or a gNodeB-distributed unit, gNB-DU, configured for a centralized deployment scenario of a 5G wireless communications network.

18. The access node according to claim 1, wherein the access node comprises a first gNodeB-distributed unit, gNB-DU in a centralized deployment scenario of a 5G wireless communications network, the first gNB-DU being a part of a first gNB further comprising one or more second gNB-DUs and a first gNodeB-centralized unit, gNB-CU, which is connected via an F1 interface to each gNB-DU, and wherein the access node is further configured perform:
    causing transmitting a request for information on the one or more second gNB-DUs to the first gNB-CU, wherein the information on the one or more second gNB-DUs comprises at least radio bearer information on each radio bearer used by each of the one or more second gNB-DUs;
    receiving requested information from the first gNB-CU; and
    in response to determining that the one or more radio bearers in the first gNB-DU or radio bearers in the one or more second gNB-DUs comprise the one or more first Xcast radio bearers using the multicast transmission mode and the one or more other second radio bearers using the unicast transmission mode, performing the scheduling of the one or more radio bearers according to the first scheduling mechanism, wherein the first scheduling mechanism further takes into account the information on the one or more second gNB-DUs by prioritizing one or more second Xcast radio bearers using a unicast transmission mode in the first gNB-DU over other unicast radio bearers in the first gNB-DU in response to the one or more second Xcast radio bearers using the multicast transmission mode in at least one of the one or more second gNB-DUs.

19. A method, comprising:
    receiving a plurality of data packets associated with one or more radio bearers for scheduling from an access node to a plurality of terminal devices served by the access node; and
    determining an over-the-air transmission mode of each radio bearer of the one or more radio bearers;
    in response to determining that the one or more radio bearers comprise one or more first explicit multi-unicast, Xcast, radio bearers using a multicast transmission mode and one or more second radio bearers using a unicast transmission mode, scheduling the one or more radio bearers according to a first scheduling mechanism, wherein the first scheduling mechanism prioritizes the one or more first Xcast radio bearers over the one or more second radio bearers to maximize a system throughput associated with the access node by performing one of:
        throttling each of the one or more first Xcast radio bearers according to a first throttling rate and each of the one or more second radio bearers according to a second throttling rate larger than the first throttling rate, wherein the first throttling rate is defined separately for each first Xcast radio bearer based on the number of terminal devices served by said first Xcast radio bearer and the first throttling rate and the second throttling rate are defined to depend at least on the amount of congestion in the access node, and
        throttling each of the one or more second radio bearers according to a third throttling rate, wherein the third throttling rate is defined to depend at least on the amount of congestion in the access node.

20. A non-transitory computer readable medium comprising program instructions stored thereon for performing, when executed in hardware, at least the following:
    receiving a plurality of data packets associated with one or more radio bearers for scheduling from an access node to a plurality of terminal devices served by the access node; and
    determining an over-the-air transmission mode of each radio bearer of the one or more radio bearers;
    in response to determining that the one or more radio bearers comprise one or more first explicit multi-unicast, Xcast, radio bearers using a multicast transmission mode and one or more second radio bearers using a unicast transmission mode, scheduling the one or more radio bearers according to a first scheduling mechanism, wherein the first scheduling mechanism prioritizes the one or more first Xcast radio bearers over the one or more second radio bearers to maximize a system throughput associated with the access node by performing one of:
        throttling each of the one or more first Xcast radio bearers according to a first throttling rate and each of the one or more second radio bearers according to a second throttling rate larger than the first throttling rate, wherein the first throttling rate is defined separately for each first Xcast radio bearer based on the number of terminal devices served by said first Xcast radio bearer, and the first throttling rate and the second throttling rate are defined to depend at least on the amount of congestion in the access node, and
        throttling each of the one or more second radio bearers according to a third throttling rate, wherein the third throttling rate is defined to depend at least on the amount of congestion in the access node.

* * * * *